United States Patent

Angermair

[11] Patent Number: 5,100,208
[45] Date of Patent: Mar. 31, 1992

[54] PRESSURE CONTROL VALVE FOR COMPRESSED-AIR-ACTUATED VEHICLE BRAKE SYSTEM

[75] Inventor: Ernst Angermair, Bietigheim-Bissingen, Fed. Rep. of Germany

[73] Assignee: Robert Bosch GmbH, Stuttgart, Fed. Rep. of Germany

[21] Appl. No.: 631,003

[22] Filed: Dec. 19, 1990

[30] Foreign Application Priority Data

Dec. 22, 1989 [DE] Fed. Rep. of Germany ....... 3942563
May 21, 1990 [DE] Fed. Rep. of Germany ....... 4016312
Dec. 4, 1990 [DE] Fed. Rep. of Germany ....... 4038575

[51] Int. Cl.$^5$ ............................................. B60T 15/52
[52] U.S. Cl. ..................... 303/36; 303/118; 303/119 R
[58] Field of Search ............. 303/118, 119, 28, 33, 303/36, 37

[56] References Cited

U.S. PATENT DOCUMENTS

| 3,950,035 | 4/1976 | Tribe | 303/118 |
| 4,193,643 | 3/1980 | Knight | 303/118 |
| 4,210,370 | 7/1980 | Mortimer | 303/118 |
| 4,643,491 | 2/1987 | McCann et al. | 303/118 |
| 4,740,041 | 4/1988 | Pannbacker | 303/118 |

FOREIGN PATENT DOCUMENTS

| 0145858 | 6/1985 | European Pat. Off. |
| 0147585 | 10/1985 | European Pat. Off. |
| 2517571 | 10/1975 | Fed. Rep. of Germany |
| 3345697 | 6/1985 | Fed. Rep. of Germany |
| 3714950 | 12/1988 | Fed. Rep. of Germany |
| 3821044 | 6/1989 | Fed. Rep. of Germany |
| 2267913 | 11/1975 | France |

*Primary Examiner*—Robert J. Oberleitner
*Assistant Examiner*—Lee W. Young
*Attorney, Agent, or Firm*—Edwin E. Greigg; Ronald E. Greigg

[57] ABSTRACT

A pressure control valve having a pressure fluid inlet chamber connected to a pressure fluid source via a brake valve. A pressure fluid outlet chamber of the pressure control valve communicates with a brake cylinder. The pressure fluid inlet chamber and the pressure fluid outlet chamber can be connected to a control chamber via an inlet valve. The pressure fluid outlet chamber can be connected to the atmosphere via a controllable outlet valve. From the pressure fluid outlet chamber, a first connecting conduit leads to the control chamber of the inlet valve. The first connecting conduit can be monitored by a control valve embodied as a 2/2-way valve. A second connecting conduit, which is always open, is also provided between the control chamber of the inlet valve and the pressure fluid inlet chamber. This conduit exerts a delaying action upon pressure fluid flowing at high speed through it. The pressure control valve is usable in compressed-air-actuated vehicle brake systems, in particular those having an anti-skid system.

6 Claims, 2 Drawing Sheets

PRESSURE CONTROL VALVE FOR COMPRESSED-AIR-ACTUATED VEHICLE BRAKE SYSTEM

STATE OF THE ART

The invention relates to a pressure control valve for compressed-air-actuated vehicle brake systems as defined hereinafter.

Such pressure control valves are known (German Offenlegungsschrift 33 45 697). A pressure control valve of this kind has a pressure fluid inlet chamber, to be connected to a pressure fluid source via a pressure fluid inlet, and a pressure fluid output chamber, to be connected to a consumer, such as the wheel brake cylinder of a vehicle.

The pressure fluid outlet chamber can be connected at one end to the pressure fluid inlet chamber, via a controllable inlet valve, and at the other to the atmosphere, via a controllable outlet valve. With a first operative face, an actuating piston serving to actuate the outlet valve defines the pressure fluid outlet chamber, and with a second operative face opposed to the first operative face, it defines a control chamber. The control chamber can be connected selectively to the atmosphere or to the pressure fluid inlet chamber via a magnet-actuatable control valve.

The actuating piston is acted upon by the pressure in the pressure fluid outlet chamber in the opening direction of the outlet valve and by the pressure in the control chamber in the closing direction of the outlet valve.

Feeding of pressure into the consumer can be effected from a source of pressure fluid, for instance via a valve embodied as a combined inlet and outlet valve, such as a brake valve, and the opened inlet valve of the pressure control valve, with simultaneous action upon the control chamber associated with the outlet valve of the pressure control valve by the pressure fluid in the pressure fluid inlet chamber.

The reduction of pressure in the consumer is then effected likewise via the pressure control valve inlet valve, which is in the opening position, and via the pressure fluid inlet chamber and the outlet valve of the combined inlet and outlet valve preceding the pressure control valve. The control chamber of the outlet valve of the pressure control valve is likewise vented via the pressure fluid inlet chamber, via the associated control valve.

Only if a regulated reduction of pressure in the consumer is to take place is the pressure in the consumer lowered via the pressure control valve outlet valve by triggering of the control valve associated with the pressure control valve outlet valve.

When pressure reduction in the consumer is not regulated, venting of the consumer accordingly always takes place via the inlet and outlet valve preceding the pressure control valve, or via a preceding relay valve; in other words, in such a case the pressure control valve acts merely as a passageway.

A disadvantage in this known pressure control valve is that the process of venting the consumer is relatively time-consuming.

ADVANTAGES OF THE INVENTION

The pressure control valve according to the invention have an advantage over the prior art that rapid venting of the consumer is attained via the outlet valve of the pressure control valve. Moreover, fine graduation of the pressure in the consumer and absolutely complete venting of the consumer are also possible. This is attained by means of a provision requiring little effort or expense.

Advantageous modifications of and improvements to the pressure control valve recited herein are possible with the provisions recited hereinafter.

BRIEF DESCRIPTION OF THE DRAWING

Exemplary embodiments of the invention are shown in simplified form in the drawing and described in further detail in the ensuing description.

DESCRIPTION OF THE EXEMPLARY EMBODIMENTS

Figure 1:
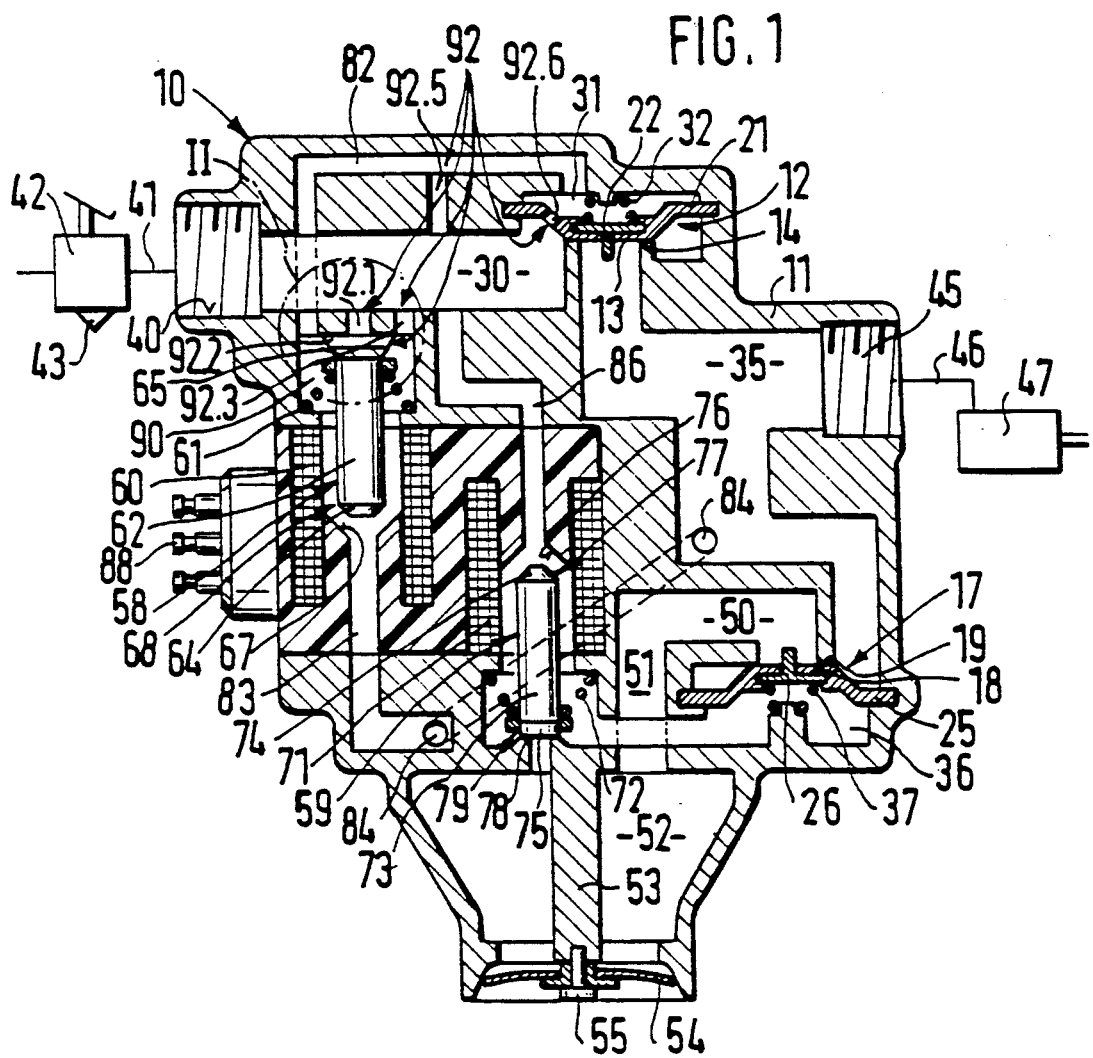
FIG. 1 shows a section through a pressure control valve with variants of the disposition of a connecting conduit between a control chamber of an inlet valve and a pressure fluid inlet chamber, and FIGS. 2–4, in the form of detail II of FIG. 1, show variants of this connecting conduit on a different scale.

In FIG. 1, a pressure control valve 10 for a compressed-air-actuated vehicle brake system is shown. The pressure control valve 10 has a housing 11, in which a controllable inlet valve 12 is disposed. This valve comprises a valve body 13 and a valve seat 14 attached to the housing. Also provided in the housing 11 is an outlet valve 17, which comprises a valve body 18 and a valve seat 19 attached to the housing.

The inlet valve 12 is actuatable by an actuating piston embodied as a diaphragm 21, which is secured by its outer peripheral region in the housing 11 and has a centrally disposed metal reinforcement 22 that supports the valve body 13. The outlet valve 17 is actuatable in the same manner by an actuating piston embodied as a diaphragm 25. This diaphragm is secured by its outer peripheral region in the housing 11 and likewise has a centrally disposed metal reinforcement 26 supporting the valve body 18.

With its operative face oriented toward the valve body 13, the diaphragm 21 of the inlet valve 12 defines a pressure fluid inlet chamber 30, and with its second operative face remote from the pressure fluid inlet chamber, it defines a control chamber 31. A spring 32 disposed in the control chamber 31 and supported on the housing 11 urges the diaphragm 21 in the closing direction of the inlet valve 12.

In the same manner, the diaphragm 25 associated with the outlet valve 17, with its first operative face oriented toward the valve body 18 of the outlet valve, defines a pressure fluid outlet chamber 35, and with its operative face remote from the pressure fluid outlet chamber it defines a control chamber 36. A spring 37 supported on the housing 11 is likewise disposed in the latter control chamber and urges the diaphragm 25 in the closing direction of the outlet valve 17.

Via the pressure fluid inlet 40, disposed in the housing 11, and a pressure fluid line 41 connected to it, the pressure fluid inlet chamber 30 communicates with a combined inlet and outlet valve embodied as a brake valve 42, which in turn communicates with a pressure fluid source, not shown. The pressure fluid outlet chamber 35 of the housing 11 communicates with a consumer embodied as a brake cylinder 47 via a pressure fluid outlet 45 and a pressure fluid line 46.

A chamber 50 in the housing 11 that can be blocked off from the pressure fluid outlet chamber 35 by the outlet valve 17 communicates via a conduit 51 of the housing with a venting chamber 52 leading to the atmosphere. A tang 53 attached to the housing is centrally disposed in the venting chamber 52, and an elastic flap 54 covering the venting chamber and embodied as a check valve is provided on the tang. The flap is secured to the free face end of the tang 53 with a rivet 55 and can be moved in the direction of the atmosphere into the open position.

Two electromagnet valves serving as control valves 58, 59 for the inlet valve 12 and the outlet valve 17 are disposed in the housing 11.

The first control valve 58 for the inlet valve 12 of the pressure control valve 10 is composed of a coil 60 with an armature guide tube and an armature 62 disposed so that it is displaceable counter to the force of a spring 61. In the position shown, the armature 62 is supported, under the influence of the spring 61, on a protrusion 65 of the housing 11. On its face end remote from the spring, the armature 62 has a valve closing body 64, and with the valve seat 67 it forms an outlet control valve 68.

The second control valve 59 for the outlet valve 17 of the pressure control valve 10 is likewise composed of a coil 71 with an armature guide tube and an armature 73 disposed so that it is displaceable counter to the force of a spring 72; the armature 73 has one valve closing body 74 and 75 each on its face ends remote from one another. One valve closing body 74 and a first valve seat 76 form an inlet control valve 77, and the other valve closing body 75 and a second valve seat 78 form an outlet control valve 79.

The control chamber 31 for the inlet valve 12 communicates (as shown) with the pressure fluid outlet chamber 35 via a first connecting conduit 82, 83, 84. This connecting conduit 82, 83, 84 can be monitored by the first control valve 58 embodied as a 2/2-way valve.

Via the second control valve 59 associated with the control chamber 36 for the outlet valve 17 of the pressure control valve 10, the control chamber can be connected selectively with the atmosphere or (as shown) via a conduit 86 with the pressure fluid inlet chamber 30. The second control valve 59 is therefore embodied as a 3/2-way valve.

The electromagnet valves serving as control valves 58 and 59 are triggerable via electric connections 88.

A chamber 90, which receives the spring 61 and part of the armature 62 of the first control valve 58, is associated with the first control valve 58 in the housing 11 of the pressure control valve 10. The chamber 90 is disposed in the course of the first connecting conduit 82, 83, 84: The segment 82 of the first connecting conduit 82, 83, 84 originates at its end remote from the first valve seat 67 and leads to the control chamber 31 of the inlet valve 12. The segment 83 of the connecting conduit 82, 83, 84 continues from the valve seat 67 and ends with the segment 84 in the pressure fluid outlet chamber 35.

Figure 2:
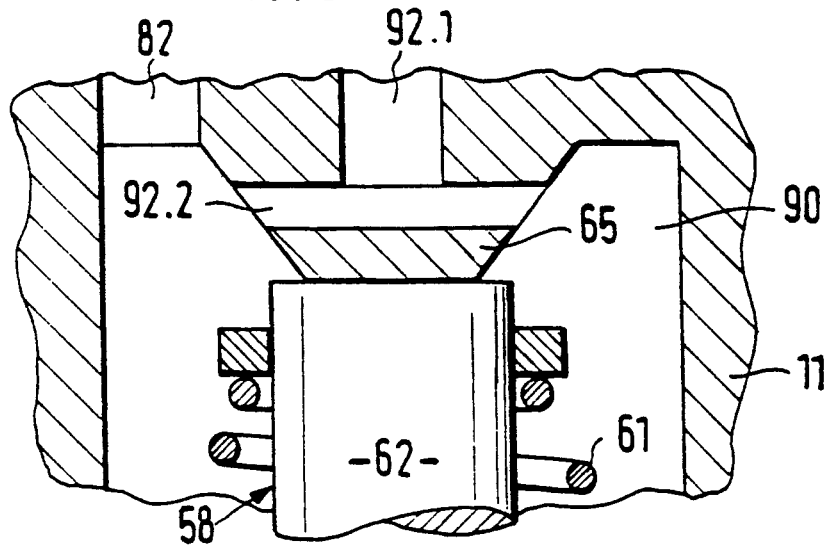
Figure 3:
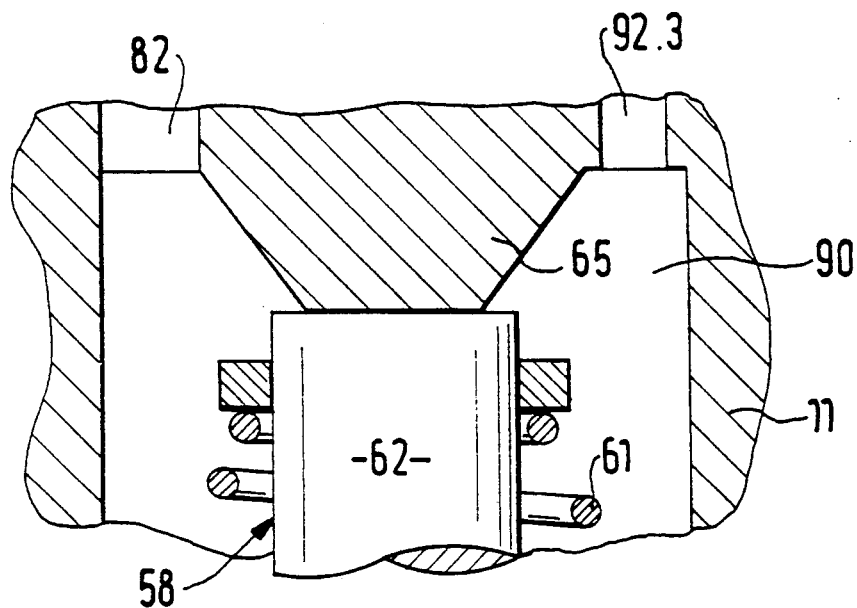
Figure 4:
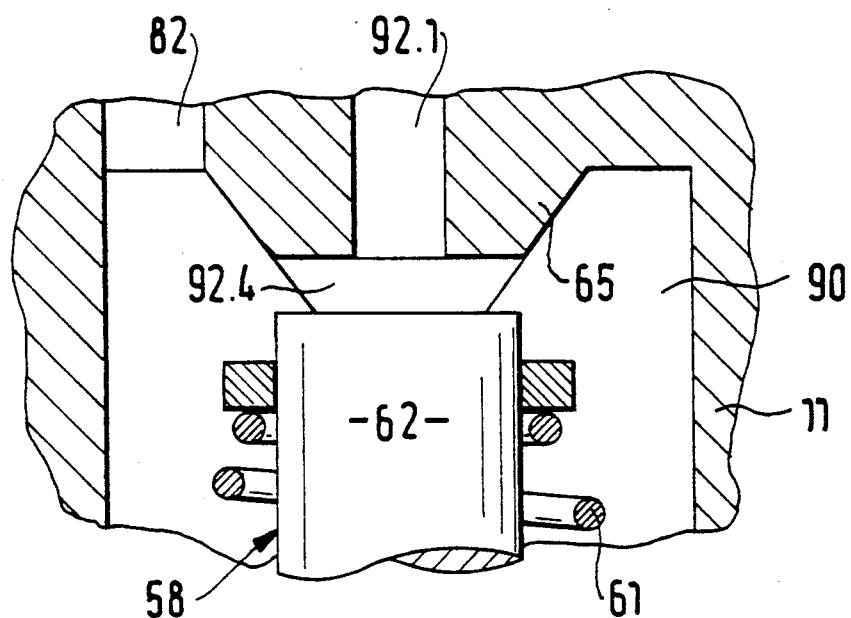

The pressure control valve 10 is also provided with a second connecting conduit 92, between the control chamber 31 of the inlet valve 12 and the pressure fluid inlet chamber 30. This connecting conduit 92 can be embodied in several variant ways: It may be formed as a bore 92.1 originating at the pressure fluid inlet chamber 30 and ending obliquely at the extension 65 of the housing 11, with a transverse bore 92.2 discharging in the chamber 90 (FIG. 2). Or it may be embodied as a bore 92.3 joining the chamber 90 of the first control valve 58 to the pressure fluid inlet chamber 30 beside the extension 65 of the housing 11 (FIG. 3). Or it may form a slit 92.4 extending on the face end in the extension 65 of the housing 11, into which the slit the bore 92.1 discharges (FIG. 4). Or it can extend in the form of a bore 92.5 between the segment 82 of the first conduit connection 82, 83, 84 and the pressure fluid inlet chamber 30 (FIG. 1). The connecting conduit 92 can also be embodied as an opening 92.6 in the diaphragm 21 of the inlet valve 12 (FIG. 1). In variants 92.1–92.5, the second connecting conduit 92 can make complete or partial joint use of the segment 82 of the first connecting conduit 82, 83, 84.

While the first connecting conduit 82, 83, 84 is monitorable or in other words can be interrupted by the first control valve 58, the second connecting conduit 92 is contrarily always open. Moreover, it exerts a delaying action upon pressure fluid flowing at high speed through it; in other words, it is capable of producing a pressure drop between the pressure fluid inlet chamber 30 and the control chamber 31 of the inlet valve 12.

The pressure control valve 10 has the following function:

In a normal braking event tripped by the driver of the vehicle, pressure fluid is fed into the pressure fluid inlet chamber 30 by the brake valve 42 through the pressure fluid line 41 and the pressure fluid inlet 40. Via the pressure fluid inlet chamber 30, the pressure fluid reaches the inlet valve 12. At the same time, pressure fluid flows through the conduit 86 serving as a control line and the inlet control valve 77, which is in the opened position, of the unexcited second control valve 59, into the control chamber 36 of the outlet valve 17 of the pressure control valve 10 and keeps the outlet valve closed. The outlet control valve 79 of the second control valve 59 is contrarily in its closing position. The outlet control valve 68 of the first control valve 58 assumes its open position.

The pressure building up in the pressure fluid inlet chamber 30 urges the diaphragm 21 of the inlet valve 12 in the opening direction, counter to the force of the spring 32, and thus puts the inlet valve 12 in its open position. Since the pressure fluid flowing through the second connecting conduit 92 into the control chamber 31 of the inlet valve 12 builds up pressure there in a delayed fashion, the inlet valve remains opened. Pressure fluid now flows from the pressure fluid inlet chamber 30 through the opened inlet valve 12 into the pressure fluid outlet chamber 35 and from there through the pressure fluid outlet 45 and the pressure fluid line 46 into the brake cylinder 47.

The pressure in the pressure fluid outlet chamber 35 urges the diaphragm 25 of the outlet valve 17 in the opening direction. Since the level of control pressure building up in the control chamber 36 of the outlet valve 17 is equal to the level of the consumer pressure building up in the pressure fluid outlet chamber 35, yet the operative face of the diaphragm 25 toward the control chamber 36 is larger than the operative face of the diaphragm 25 toward the pressure fluid outlet chamber 35, the outlet valve 17 remains in the closed position.

The pressure prevailing in the pressure fluid outlet chamber 35 is also effective in the control chamber 31 of the inlet valve 12 on the back side of the diaphragm 21, through the first connecting conduit 82, 83, 84, when the nonexcited first control valve 58 is open. As a result, once a pressure increase is completed, this diaphragm assumes a floating state, so that it moves even at small variations in pressure; in cold weather, this largely prevents freezing of the diaphragm 21 on the valve seat 14.

If the brake valve 42 is switched over by the vehicle driver, for fast venting of the work chamber of the brake cylinder 47, then the pressure fluid line 41 and the pressure fluid inlet 40 communicating with it are vented toward the atmosphere, via a relief location 43 of the brake valve 42. Via the brake valve 42, the pressure in the pressure fluid inlet chamber 30 also drops rapidly, so that because of the higher pressure prevailing in the pressure fluid outlet chamber 35, which acts upon the diaphragm 21 through the first connecting conduit 82, 83, 84 and the control chamber 31, this diaphragm covers the valve seat 14, and the inlet valve 12 acts as a closing valve, like a check valve. As a consequence of this rapid drop in pressure in the pressure fluid inlet chamber 30, the control pressure in the control chamber 36 under the diaphragm 25 of the outlet valve 17 collapses via the conduit 86. The outlet valve 17 opens, and the brake cylinder 47 is rapidly vented over a short distance to the atmosphere. The diaphragm 21 of the inlet valve 12 remains in its closed position at this time, because as the pressure in the pressure fluid inlet chamber 30 continues to fall, the pressure in the control chamber 31 decreases only in delayed fashion through the second connecting conduit 92.

Once the pressure in the brake cylinder 47 and thus the pressure in the pressure fluid outlet chamber 35 and in the pressure fluid inlet chamber 30 as well has dropped far enough that it is virtually at the level of atmospheric pressure, the outlet valve 17 assumes the closed position, by the force of the spring 37. The inlet valve 12 also remains in the closed position because of the force of the spring 32. A residual pressure in the brake cylinder 47 can drop to the atmosphere via the pressure fluid outlet chamber 35, the first connecting conduit 82, 83, 84 and the second connecting conduit 92 as well as the brake pressure fluid inlet chamber 30 and the brake valve 42.

If the vehicle driver wishes to reduce the pressure in the work chamber of the brake cylinder 47 sensitively, then a slow lowering of brake pressure at the break valve 42 likewise causes a slow reduction of pressure in the pressure fluid inlet chamber 30. This slow pressure reduction, via the second connecting conduit 92, brings about a synchronously elapsing pressure reduction in the control chamber 31 of the inlet valve 12. Because the brake pressure in the pressure fluid outlet chamber 35 now exceeds the pressure in the control chamber 31, the inlet valve 12 opens, and the pressure fluid flows through the pressure fluid inlet chamber 30 to the relief location 43 of the brake valve 42. The resultant cancellation of the closing action of the inlet valve 12 thus enables sensitive graduation of brake pressure by means of the brake valve 42. Once virtual atmospheric pressure is attained in the pressure fluid inlet chamber 30, pressure fluid outlet chamber 35 and brake cylinder 47, the inlet valve 12 closes. Residual pressure in the brake cylinder 47 is now reduced to the atmosphere, via the first connecting conduit 82, 83, 84 and the second connecting conduit 92 as well as the pressure fluid inlet chamber 30 and the brake valve 42.

Because of the hysteresis of the outlet valve 17, this valve remains closed during slow reduction of brake pressure.

If the pressure in the brake cylinder 47 is to be regulated by the anti-skid system (not shown) of the vehicle brake system during a braking event, this is done in a known manner by cyclic triggering of the control valves 58 and 59 embodied as electromagnet valves:

If a regulated reduction of pressure is to take place in the brake cylinder 47, then via the first control valve 58, by closure of its outlet control valve 68, the pressure acting from the pressure fluid inlet chamber 30 via the second connecting conduit 92 is trapped in the control chamber 31 of the inlet valve 12, so that the diaphragm 21 engages the valve seat 14 by spring force. Simultaneously, the second control valve 59 associated with the control chamber 36 of the outlet valve 17 is triggered in such a manner that the inlet control valve 77 of this control valve 59 assumes the closed position, and the outlet control valve 79 of the control valve 59 is opened. The control pressure fluid located in the control chamber 36 of the outlet valve 17 is diverted to the atmosphere via the opened outlet control valve 79 of the second control valve 59 and the venting chamber 52. The resultant pressure difference between the pressure in the control chamber 36 and that in the pressure fluid outlet chamber 35 effects an opening of the outlet valve 17 of the pressure control valve 10, so that pressure fluid can flow out of the brake cylinder 47 to the atmosphere. As a result, the pressure in the control chamber 31 predominates, and keeps the inlet valve 12 in the closing position.

For regulated holding of pressure in the brake cylinder 47 after a pressure reduction phase, the second control valve 59 associated with the control chamber 36 of the outlet valve 17 is no longer triggered, and the outlet control valve 79 of this second control valve 59 is put in the closed position. Pressure fluid is fed from the pressure fluid inlet chamber 30 through the conduit 86 into the control chamber 36 of the outlet valve 17. The control pressure building up in the control chamber 36 exerts a force upon the diaphragm 25 in the direction toward the valve seat 19, causing the outlet valve 17 to assume the closed position. The first control valve 58 associated with the inlet valve 12 remains triggered, so that the inlet valve 12 stays in its closed position. Thus no pressure fluid can flow out of the brake cylinder 47. Equally, no pressure fluid can flow out of the pressure fluid inlet chamber 30 over into the pressure fluid outlet chamber 35 and into the brake cylinder 47.

In a regulated control of pressure increase subsequent to a pressure holding phase, triggering of the first control valve 58 is ended, so that the outlet control valve 68 opens. The outlet control valve 79 of the second control valve 59 contrarily remains in its closed position, to keep the outlet valve 17 closed. The control pressure prevailing in the control chamber 31 of the inlet valve 12, which is equivalent to the pressure in the pressure fluid inlet chamber 30 and thus is higher than the pressure in the pressure fluid outlet chamber 35 can now be reduced via the first connecting conduit 82, 83, 83 to the pressure fluid outlet chamber 35. Under the influence of the higher pressure in the pressure fluid inlet chamber 30, the inlet valve 12 is opened. Pressure fluid can flow from the pressure fluid inlet chamber 30 through the pressure fluid outlet chamber 35 into the brake cylinder 47.

I claim:

1. A pressure control valve (10) for compressed-air-actuated vehicle brake systems comprising:
a pressure fluid inlet chamber (30), which communicates with a pressure fluid source via a pressure fluid inlet (40), a pressure fluid outlet chamber (35) which communicates with a brake cylinder (47) via a pressure fluid outlet (45), an inlet valve (12), via which the pressure fluid inlet chamber (30) can be connected to the pressure fluid outlet chamber (35), an outlet valve (17), via which the pressure fluid outlet chamber (35) can be connected to an atmospheric surrounding, an actuating first diaphragm (21), which is intended for actuation of the inlet valve (12) which can be urged in a closing direction of the inlet valve (12) by a pressure in a control chamber (31), a first connecting conduit (82, 83, 84) through which a fluid flows in both directions, said first connecting conduit is monitorable by a first control valve (58) between the control chamber (31) of the inlet valve (12) and the pressure fluid outlet chamber (35), a second connecting conduit (92) between the control chamber (31) of the inlet valve (12) and the pressure fluid inlet chamber (30), and a second diaphragm (25) intended for actuation of the outlet valve (17) which is capable of being urged in the closing direction of the outlet valve (17) by a pressure in a control chamber (36), which chamber can be connected selectively with the atmospheric surrounding as well as with the pressure fluid inlet chamber (30) via a second control valve (59), said first control valve (58) is a 2/2-way valve; and said second connecting conduit (92), which exerts a delaying action upon pressure fluid flowing at high speed, is always open.

2. A pressure control valve as defined by claim 1, in which the first connecting conduit (82, 83, 84) and the second connecting conduit (92) have a common segment (82) which discharges into the control chamber (31) of the inlet valve (12).

3. A pressure control valve as defined by claim 2, in which the second connecting conduit (92) is embodied by a bore (92.5) originating at the pressure fluid inlet chamber (30), which bore discharges into a segment (82) of the first conduit connection (82, 83, 84) that communicates with the control chamber (31) of the inlet valve (12).

4. A pressure control valve as defined by claim 2, in which the second connecting conduit (92) forms a bore (92.1, 92.2, 92.3) originating at the pressure fluid inlet chamber (30) which discharges at least indirectly into a chamber (90) associated with the first control valve (58), from which chamber (90) a segment (82) of the first connecting conduit (82, 83, 84) originates and leads to the control chamber (31) of the inlet valve (12).

5. A pressure control valve as defined by claim 1, in which the second connecting conduit (92) forms a bore (92.1, 92.2, 92.3) originating at the pressure fluid inlet chamber (30) which discharges at least indirectly into a chamber (90) associated with the first control valve (58), from which chamber (90) a segment (82) of the first connecting conduit (82, 83, 84) originates and leads to the control chamber (31) of the inlet valve (12).

6. A pressure control valve (10) for compressed-air-actuated vehicle brake systems comprising:

a pressure fluid inlet chamber (30), which communicates with a pressure fluid source via a pressure fluid inlet (40), a pressure fluid outlet chamber (35) which communicates with a brake cylinder (47) via a pressure fluid outlet (45), an inlet valve (12), via which the pressure fluid inlet chamber (30) can be connected to the pressure fluid outlet chamber (35), an outlet valve (17), via which the pressure fluid outlet chamber (35) can be connected to an atmospheric surrounding, an actuating first diaphragm (21), which is intended for actuation of the inlet valve (12) which can be urged in a closing direction of the inlet valve (12) by a pressure in a control chamber (31), a first connecting conduit (82, 83, 84) monitorable by a first control valve (58) between the control chamber (31) of the inlet valve (12) and the pressure fluid outlet chamber (35), a second connecting conduit (92) between the control chamber (31) of the inlet valve (12) and the pressure fluid inlet chamber (30), said second connecting conduit (92) being embodied as an opening (92.6) in said first diaphragm (21) of the inlet valve (12), and a second diaphragm (25) intended for actuation of the outlet valve (17) which is capable of being urged in the closing direction of the outlet valve (17) by a pressure in a control chamber (36), which chamber can be connected selectively with the atmospheric surrounding as well as with the pressure fluid inlet chamber (30) via a second control valve (59), said first control valve (58) is a 2/2-way valve; and said second connecting conduit (92), which exerts a delaying action upon pressure fluid flowing at high speed, is always open.

* * * * *